(12) United States Patent
Siden et al.

(10) Patent No.: US 8,231,353 B2
(45) Date of Patent: Jul. 31, 2012

(54) METHODS AND APPARATUS RELATING TO IMPROVED TURBINE BLADE PLATFORM CONTOURS

(75) Inventors: Gunnar L. Siden, Greenville, SC (US); Craig A. Bielek, Simpsonville, SC (US); Brian C. Barr, Schenectady, NY (US); Bradley T. Boyer, Greenville, SC (US); Thomas W. Vandeputte, Simpsonville, SC (US); Peter A. Galie, Cherry Hill, NJ (US)

(73) Assignee: General Electric Company, Schenectady, NY (US)

( * ) Notice: Subject to any disclaimer, the term of this patent is extended or adjusted under 35 U.S.C. 154(b) by 804 days.

(21) Appl. No.: 12/347,341

(22) Filed: Dec. 31, 2008

(65) Prior Publication Data

US 2010/0166558 A1 Jul. 1, 2010

(51) Int. Cl.
*F01D 5/22* (2006.01)
(52) U.S. Cl. ............ 416/193 A; 416/196 R; 416/219 R; 416/220 R
(58) Field of Classification Search .............. 416/193 A, 416/196 R, 219 R, 220 R
See application file for complete search history.

(56) References Cited

U.S. PATENT DOCUMENTS

| | | | | |
|---|---|---|---|---|
| 6,283,713 | B1* | 9/2001 | Harvey et al. | 416/193 A |
| 6,524,070 | B1 | 2/2003 | Carter | |
| 6,561,761 | B1* | 5/2003 | Decker et al. | 415/173.1 |
| 6,669,445 | B2 | 12/2003 | Staubach et al. | |
| 2002/0127108 | A1* | 9/2002 | Crall et al. | 416/213 R |
| 2008/0232968 | A1* | 9/2008 | Nguyen | 416/193 R |
| 2010/0080708 | A1* | 4/2010 | Gupta et al. | 416/223 A |

* cited by examiner

*Primary Examiner* — Robert Pascal
*Assistant Examiner* — Kimberly Glenn
(74) *Attorney, Agent, or Firm* — Mark E. Henderson; Ernest G. Cusick; Frank A. Landgraff

(57) ABSTRACT

A flow directing assembly for use in a turbine engine comprising: a plurality of circumferentially spaced blades, each of the blades including a radial projecting airfoil with a concave pressure side and a convex suction side that extend from a platform; and a plurality of flow passages, each flow passage defined by the airfoils of neighboring blades and an inner wall formed by abutting platforms of neighboring blades, the inner wall forming the inner radial boundary of the flow passage; wherein the inner wall of one or more of the flow passages comprises means for reducing frictional losses between the flow through the turbine engine and the inner wall. The means for reducing frictional losses may comprise a non-axisymmetrical trough positioned between neighboring airfoils that is configured to reduce frictional losses.

22 Claims, 7 Drawing Sheets

METHODS AND APPARATUS RELATING TO IMPROVED TURBINE BLADE PLATFORM CONTOURS

BACKGROUND OF THE INVENTION

This present application relates generally to apparatus, methods and/or systems concerning improved flow-path assemblies in turbine engines. More particularly, but not by way of limitation, the present application relates to apparatus, methods and/or systems pertaining to scalloped areas or troughs formed in turbine blade platforms that deliver enhanced engine performance.

In rotating turbomachinery, such as the compressor and turbine sections of gas or jet turbine engines and the turbine section of steam turbine engines, flow passages are defined, in part, by radially projecting airfoil surfaces and the surface from which the airfoils extend, which is generally referred to as a platform. During operation, because of the extreme velocity of the main flow, or working fluid, through the turbine, frictional losses occur, particularly as the working fluid flows over the surface area of the platform. It is very desirable to reduce these frictional losses and, thereby, increase the efficiency of the turbine engine.

BRIEF DESCRIPTION OF THE INVENTION

The present application thus describes a flow directing assembly for use in a turbine engine comprising: a plurality of circumferentially spaced blades, each of the blades including a radial projecting airfoil with a concave pressure side and a convex suction side that extend from a platform; and a plurality of flow passages, each flow passage defined by the airfoils of neighboring blades and an inner wall formed by abutting platforms of neighboring blades, the inner wall forming the inner radial boundary of the flow passage; wherein the inner wall of one or more of the flow passages comprises means for reducing frictional losses between the flow through the turbine engine and the inner wall. The means for reducing frictional losses may comprise a non-axisymmetrical trough positioned between neighboring airfoils that is configured to reduce frictional losses. Each of the troughs is circumferentially positioned between the airfoils of neighboring blades; and each of the troughs may extend from an area between the leading edges of the airfoils to an area between the trailing edges of the airfoils.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
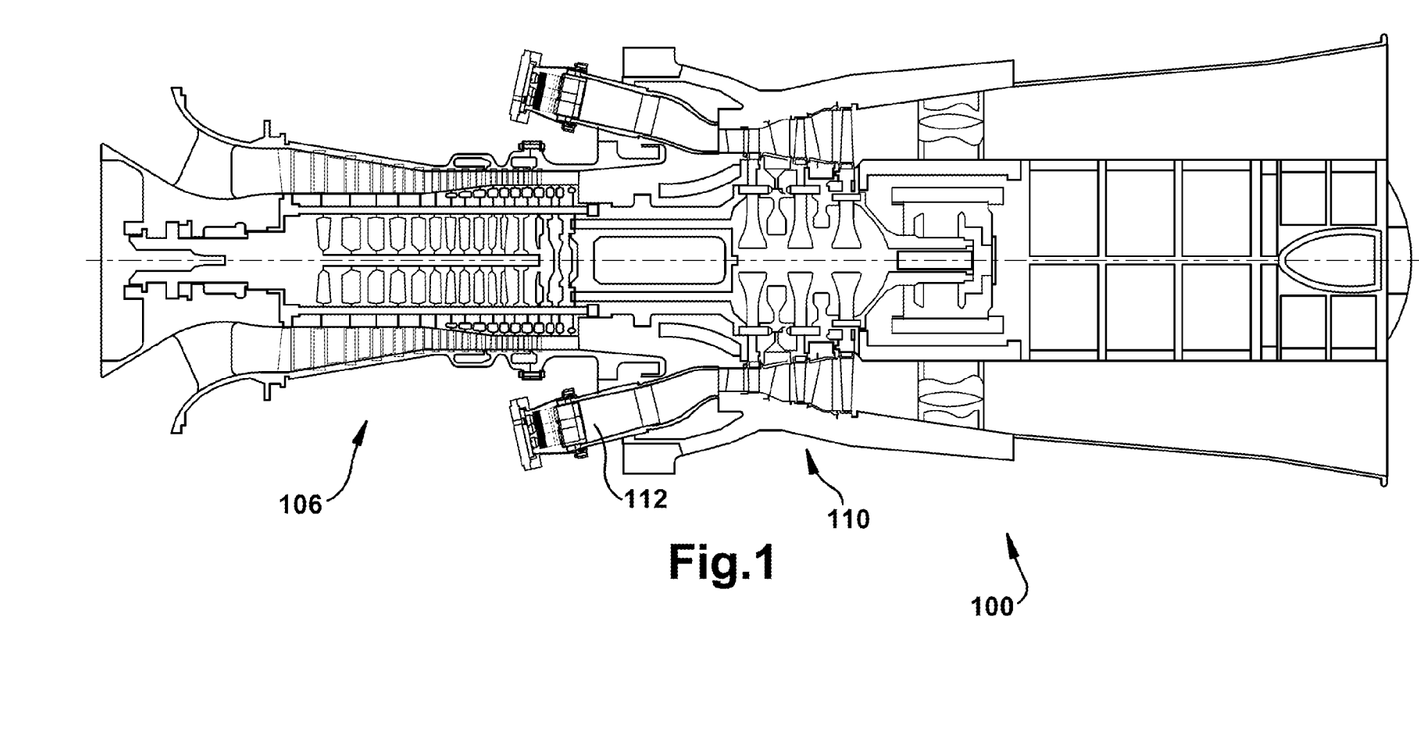
FIG. 1 is a schematic representation of an exemplary turbine engine in which certain embodiments of the present invention may be used.

Referring now to the figures, FIG. 1 illustrates a schematic representation of a gas turbine engine 100. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110. Note that the following invention may be used in all types of turbine engines, including gas turbine engines, steam turbine engines, aircraft engines, and others. Hereinafter, the invention will be described in relation to a gas turbine engine. This description is exemplary only and not intended to be limiting in any way.

Figure 2:
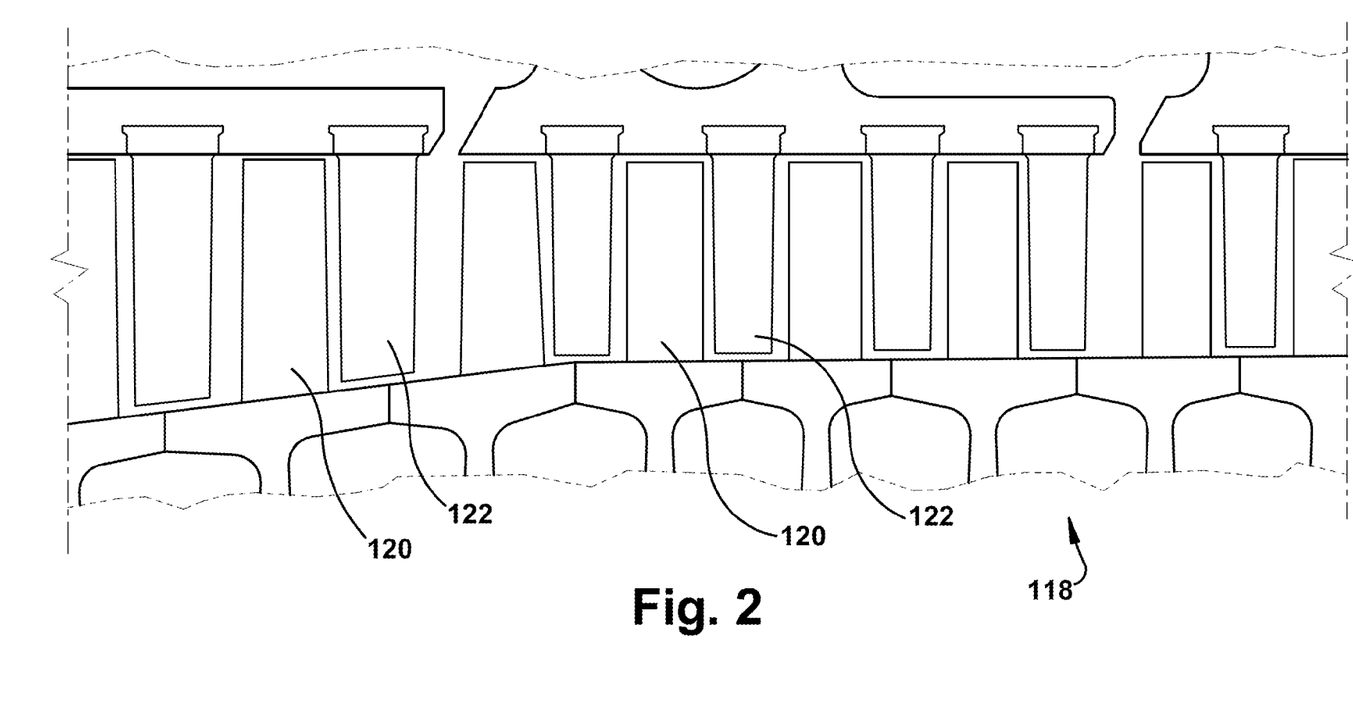
FIG. 2 is a sectional view of the compressor section of the gas turbine engine of FIG. 1.

FIG. 2 illustrates a view of an exemplary multi-staged axial compressor 118 that may be used in a gas turbine engine. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced and attached to the shaft, when the shaft rotates during operation, the compressor rotor blades 120 rotates about it. As one of ordinary skill in the art will appreciate, the compressor rotor blades 120 are configured such that, when spun about the shaft, they impart kinetic energy to the air or working fluid flowing through the compressor 118. The compressor 118 may have many other stages beyond the stages that are illustrated in FIG. 2. Additional stages may include a plurality of circumferential spaced compressor rotor blades 120 followed by a plurality of circumferentially spaced compressor stator blades 122.

Figure 3:
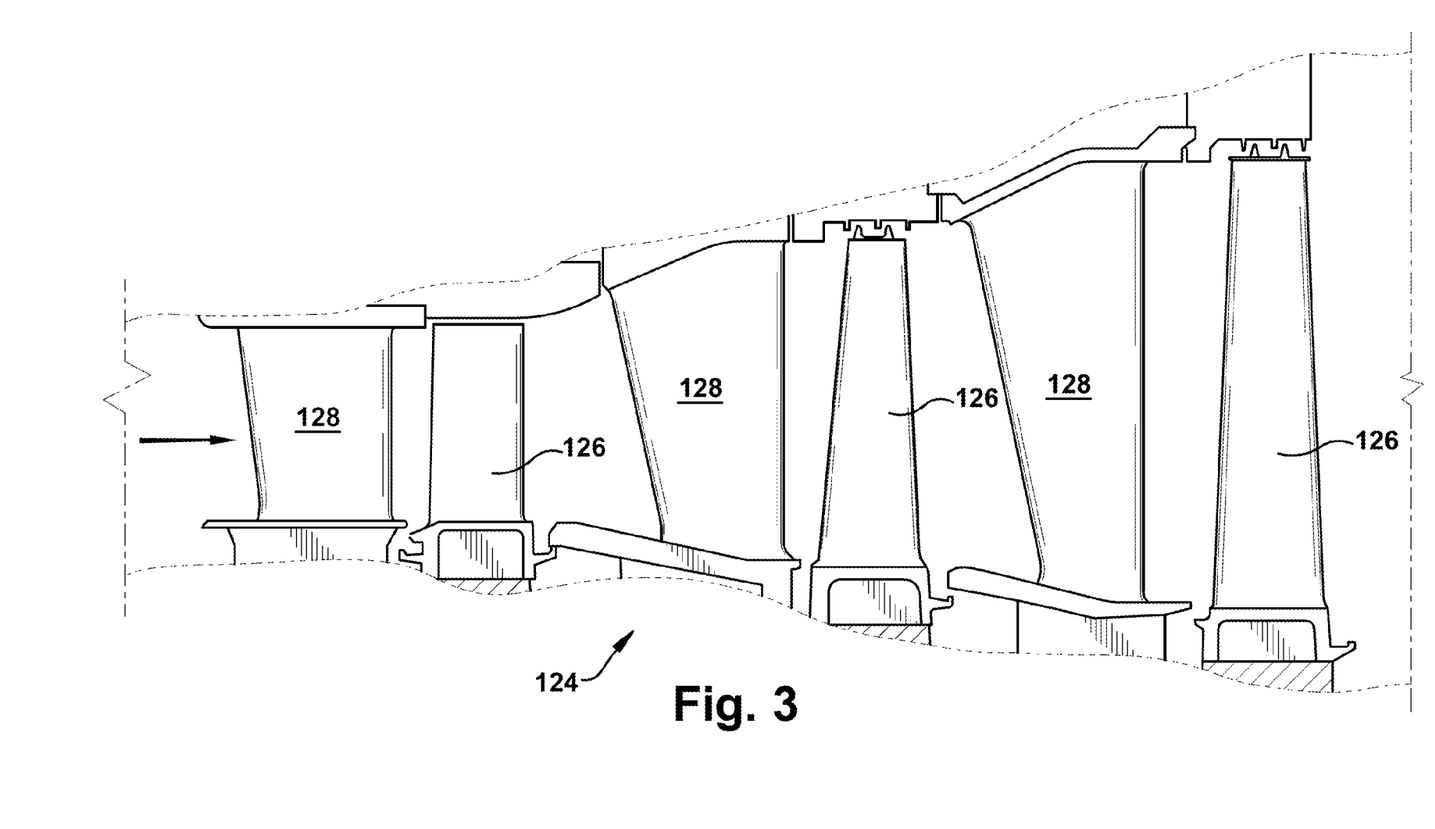
FIG. 3 is a sectional view of the turbine section of the gas turbine engine of FIG. 1.

FIG. 3 illustrates a partial view of an exemplary turbine section or turbine 124 that may be used in the gas turbine engine. The turbine 124 also may include a plurality of stages. Three exemplary stages are illustrated, but more or less stages may present in the turbine 124. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 124 also is illustrated. The second stage similarly includes a plurality of circumferentially spaced turbine stator blades 128 followed by a plurality of circumferentially spaced turbine rotor blades 126, which are also mounted on a turbine wheel for rotation. A third stage is illustrated, and similarly includes a plurality of turbine stator blades 128 and rotor blades 126. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have many other stages beyond the stages that are illustrated in FIG. 3. Each additional stage may include a row of turbine stator blades 128 followed by a row of turbine rotor blades 126.

Note that as used herein, reference, without further specificity, to "rotor blades" is a reference to the rotating blades of either the compressor 118 or the turbine 124, which include both compressor rotor blades 120 and turbine rotor blades 126. Reference, without further specificity, to "stator blades" is a reference to the stationary blades of either the compressor 118 or the turbine 124, which include both compressor stator blades 122 and turbine stator blades 128. The term "turbine blades" or "blades" will be used herein to refer to either type of blade. Thus, without further specificity, the term "turbine blades" or "blades" are inclusive to all type of turbine engine blades, including compressor rotor blades 120, compressor stator blades 122, turbine rotor blades 126, and turbine stator blades 128.

In use, the rotation of compressor rotor blades 120 within the axial compressor 118 may compress a flow of air. In the combustor 112, energy may be released when the compressed air is mixed with a fuel and ignited. The resulting flow of hot gases from the combustor 112 then may be directed over the turbine rotor blades 126, which may induce the rotation of the turbine rotor blades 126 about the shaft, thus transforming the energy of the hot flow of gases into the mechanical energy of the rotating blades and, because of the connection between the rotor blades in the shaft, the rotating shaft. The mechanical energy of the shaft may then be used to drive the rotation of the compressor rotor blades 120, such that the necessary supply of compressed air is produced, and also, for example, a generator to produce electricity.

Figure 4:
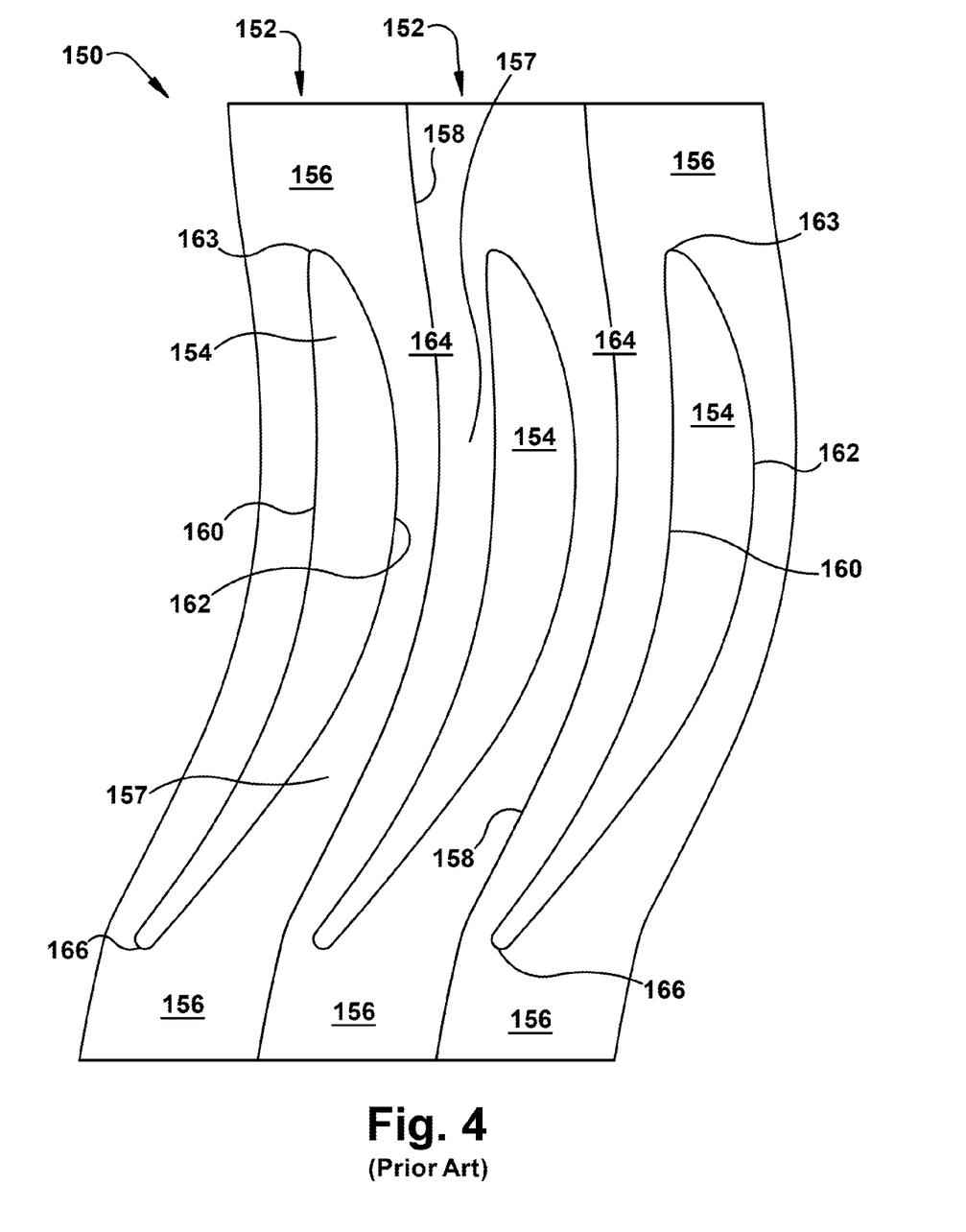
FIG. 4 is a view from a radially outward position of a portion of a flow directing assembly in which certain embodiments of the present invention may be used.

FIG. 4 illustrates a portion of a flow directing assembly 150, according to conventional design, that may be used in a rotary machine, such as in the compressor 106 or the turbine 110 illustrated in FIGS. 1 through 3. Generally, the flow directing assembly 150 has a plurality of blades 152, each having an airfoil 154 and a platform 156. The platforms 156 of neighboring blades 152 abut at platform joints 158 with the abutting adjacent platforms 156, forming an inner radial boundary, or "inner wall 157", to the flow passage formed in between neighboring airfoils. Generally, platforms 156 are configured such that the radial height of neighboring platforms 156 are the same at the platform joint 158 such that a relatively smooth surface is maintained at the joint 158 and along the inner wall. As one of ordinary skill in the art will appreciate, each airfoil 154 has a pressure side 160, a suction side 162, a leading edge 163 and a trailing edge 166. As illustrated, adjacent airfoils 154 in the assembly 150 form fluid flow passages 164, which include the volume generally bound by the abutting platforms 156 (i.e., the inner wall 157) and, on one side, the pressure side 160 of an airfoil 154, and, on the other side, the suction side 162 of a neighboring airfoil 154. Typically, the platforms 156 are shaped either in an axisymmetrical way or, as one of ordinary skill in the art will appreciate, in a non-axisymmetrical manner that is aimed at the reducing shock loss that typically occurs across the span of the platform 156.

Figure 5:
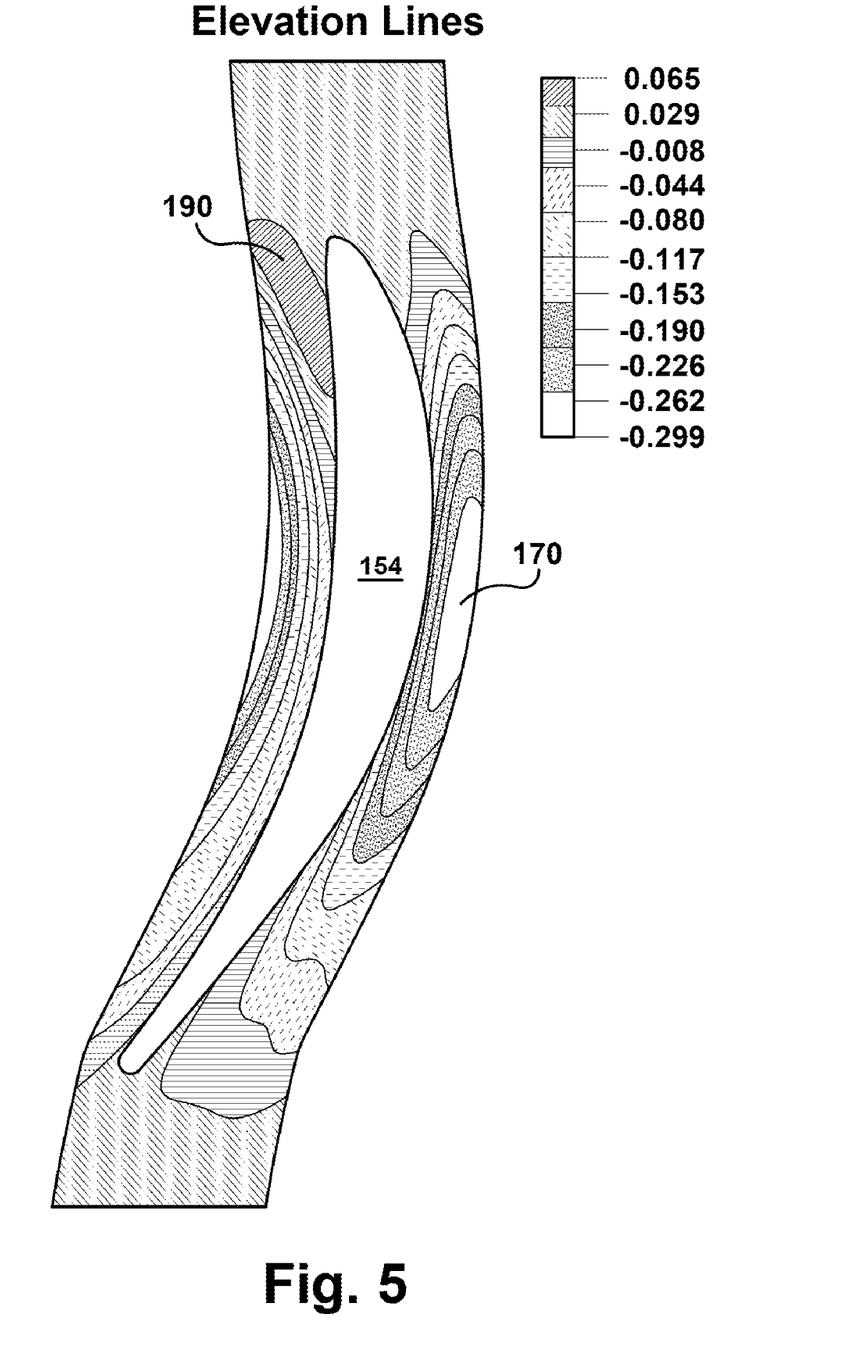
FIG. 5 is a view from a radially outward position of a portion of a flow directing assembly that has a platform formed with a trough in accordance with an exemplary embodiment of the present invention.

FIG. 5 illustrates a portion of a flow directing assembly 150, in accordance with an exemplary embodiment of the present application that, generally, may be used in, for example, the compressor 106 or the turbine 110 illustrated in FIGS. 1 through 4 or other types of turbomachinery. As further illustrated in FIGS. 6 and 7, in accordance with an exemplary embodiment of the present invention, the platform 156 may include a non-axisymmetric swale or trough 170 generally positioned between neighboring airfoils 154. It has been discovered that troughs configured in accordance with the embodiments described herein offer several operational advantages to the turbine engine. As one of ordinary skill in the art will appreciate, during operation, because of the extreme velocity of the working fluid through the turbine, frictional losses occur, particularly as the working fluid flows over the surface area of the platform 156. However, forming a trough that, as specified herein, has a desired radial depth, circumferential positioning, contour, and/or axial positioning, may decrease the viscous or frictional losses by increasing the volume of the fluid flow passage 164 between airfoils. That is, the increase of volume through the fluid flow passage 164 that the trough 170 provides causes a decrease to the velocity of the working fluid through the fluid flow passage 164, which, as one of ordinary skill in the art will appreciate, reduces frictional losses at the platform 156. The reduction of friction losses allows the turbine engine to operate more efficiently. This, of course, is highly desired and an important benefit relating to the troughs designs of the present application. However, as one of ordinary skill in the art will appreciate, other operational benefits may be realized with the troughs designs in accordance with the present application, such as, the reduction of shock loss, improved thermal characteristics, improved cooling characteristics of the turbine blades, and others.

Note that the troughs 170 of the present invention are generally described in relation to their relative positioning between the airfoils 154 of the two neighboring turbine blades 152. As described, the platforms 156 of neighboring turbine blades 152 meet at the joint 158 to form a substantially smooth contour or surface that extends between the pressure side 160 of one turbine blade 152 and the suction side 162 of a neighboring turbine blade 152. At some point along the surface of the platform 156 between the neighboring airfoils 154 is the platform joint 158 where the two turbine blades 152 abut. The troughs 170, in accordance with exemplary embodiments of the present application, are generally formed as continuing contours that extend across the abutting platforms 156 of neighboring blades 152, and, generally, across the joint 158 that marks the nexus of two neighboring blades 152 (though, depending on the configuration of the turbine blades 152 and the joint 150 between them, this is not an absolutely requirement). Accordingly, it is the intent in this application to describe the troughs 170 of the present invention in relation to their positioning on the abutting platforms 156 (which together form the inner wall 157) and, particularly, in relation to their positioning between 156 between the two airfoils 154 that circumferentially bracket them, and not in relation to the platform joint 158 that marks the division between two adjacent blades 152, which, as described, may vary depending on certain other design factors.

In general terms, the troughs 170 of the present invention comprise a smoothly shaped elongated bowl-like depression formed in the inner wall 157. The axis of the elongation of the trough 170 generally runs parallel to the airfoil 154. Further, the trough 170 is circumferentially positioned between the airfoils 154 of adjacent turbine blades 152, extending roughly from the area between the leading edges 163 to the area between the trailing edges 166 of the airfoils 154.

More particularly, in relation to the circumferential position of the troughs 170, a first side of the trough 170 may be formed at or near the approximate location on the inner wall 157 where the pressure side 160 of an airfoil 154 begins. The trough 170 may generally conform to the shape that the pressure side 160 of the airfoil 154 makes at the platform 156 and extend approximately from the leading edge 163 of the pressure side 160 to the trailing edge 166 of the pressure side 160. From this position, the trough 170 may extend circumferentially to a position at or near the suction side 162 of a second airfoil 154 that opposes the first airfoil 154 across the fluid flow passage 164. The trough 170 may generally conform to the shape that the suction side 162 of the airfoil 154 makes at the inner wall 157.

In regard to its axial positioning, the trough 170 generally resides in the area between the leading edges 163 of neighboring turbine blades 152 and the area between the trailing edges 166 of neighboring turbine blades 152. That is, generally, the trough 170 may be disposed between the axial location of the leading edges 163 and the axial location of the trailing edges 166 within a row of turbine blades 152. Generally, in preferred embodiments, the beginning of the trough 170 is formed in the inner wall 157 at or near the axial location of the leading edges 163 of the turbine blades 152 and extends in a downstream direction to the axial location of the trailing edges 166 of the turbine blades 152.

In regard to its radial profile or depth, the trough 170 generally slopes radially inward from a shallow depth at its perimeter to a maximum depth near its center. In certain preferred embodiments, as described above, the perimeter of the trough 170 may be approximately defined by the pressure side 160 of the airfoil of the first turbine blade 152, a line extending between the leading edges 163 of the first turbine blade 152 and a neighboring second turbine blade 152, the suction side 162 of the second turbine blade 152, and a line extending between the trailing edges 166 of the first and second turbine blades 152. The maximum radial depth of the trough 170 may be varied depending on best performance and the size of the overall turbine assembly. In some preferred embodiments, the maximum radial depth of the trough 170 may be within a range of about 0.0002 and 0.05 m. More preferably, the maximum radial depth may be within a range of about 0.0004 and 0.025 m. And ideally, the maximum radial depth may be within the range of about 0.001 and 0.01 m. Alternatively, in some preferred embodiments, the maximum radial depth may be described in relation to the radial height of the airfoil 154. In such cases, the maximum radial depth of the trough 170 may be within the range of between about 0.1% to 5% of the radial height of the airfoil 154. More preferably, the maximum radial depth of the trough 170 may be within the range of between about 0.25% to 2.5% of the radial height of the airfoil 154. And ideally, the maximum radial depth of the trough 170 may be within the range of between about 0.5% to 1% of the radial height of the airfoil 154.

Figure 6:
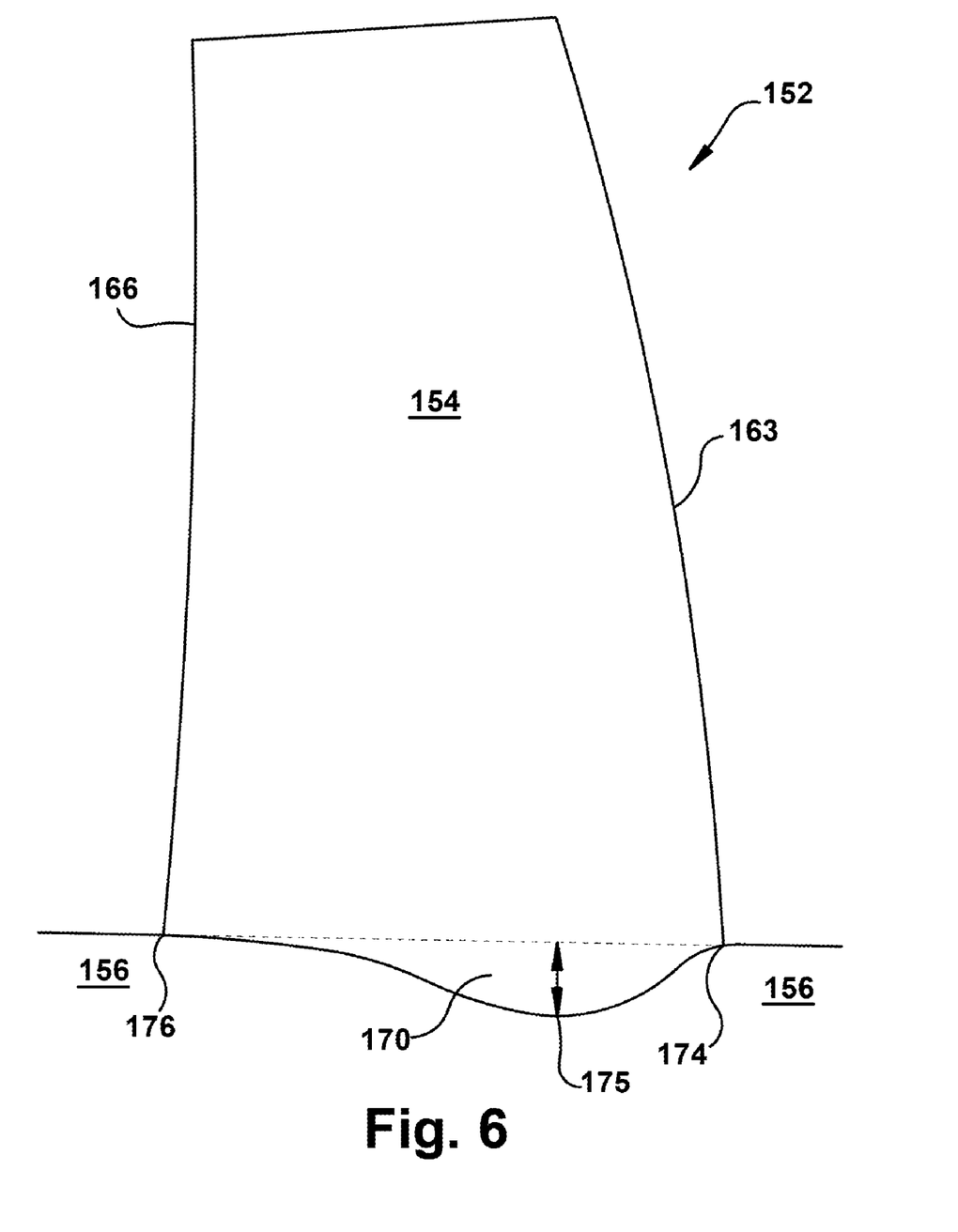
FIG. 6 is a partial sectional view of a platform and airfoil according to an exemplary embodiment of the present invention.
Figure 7:
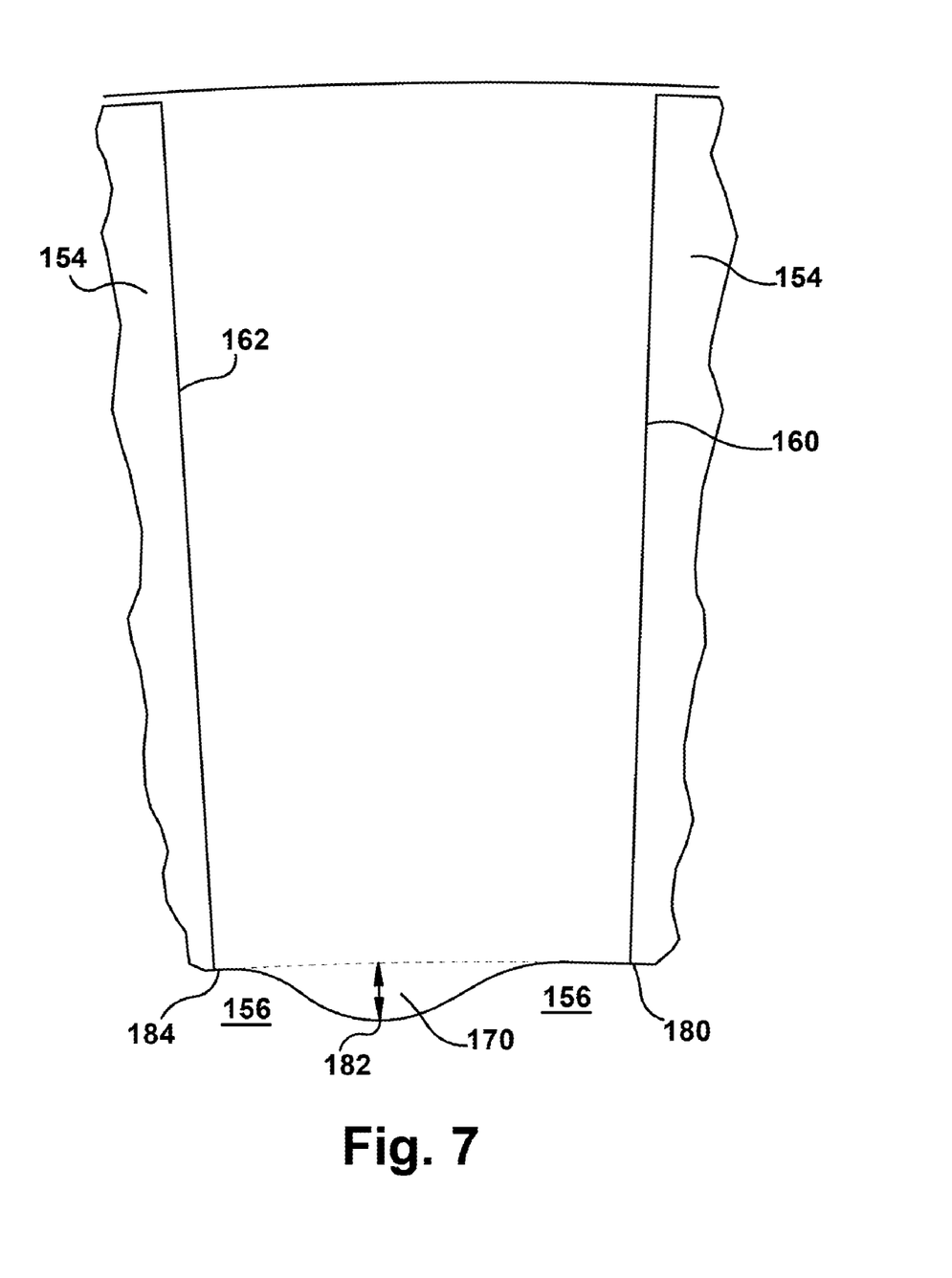
FIG. 7 is a partial sectional view of a platform and airfoil according to an exemplary embodiment of the present invention.

FIGS. 6 and 7 illustrate exemplary embodiments of the contour shape of the trough 170 in accordance with the present invention, with FIG. 6 illustrating the axial location of the trough 170 and FIG. 7 illustrating the circumferential location of the trough. It will be appreciated that FIG. 6 is a side view of a turbine blade 152 that includes an airfoil 154 and a platform 156. FIG. 6 also includes a section view of the trough 170 (note that the dotted lines illustrate the radial height of a conventional axisymmetrical platform). As shown, axially, the trough 170 generally extends from about the leading edge 163 to about the trailing edge 166 of the airfoil 154. That is, at an upstream termination point 174, which may be at about the same axial location as the leading edge 163 of the airfoil 154, the trough 170 may extend in a downstream direction, through a maximum depth point 175, and terminate at a downstream termination point 176. As illustrated, from the upstream termination point 174 the trough 170 generally forms a smooth convex curve that extends in an inward radial direction. At a point approximately halfway between the upstream termination point 174 and the maximum depth point 175, the contour shape of the trough 170 may smoothly transition from a convex shape to a concave shape that continues in an inward radial direction. At the maximum depth point 175, the smooth concave curve may continue, though at this point the trough extends in an outward radial direction. At a point approximately halfway between the maximum depth point 175 and the downstream termination point 176, the contour shape of the trough 170 may smoothly transition from a concave shape to a convex shape that continues in an outward radial direction until it reaches the downstream termination point 176.

As illustrated in FIG. 6, the maximum depth point 175 may be located closer to the upstream termination point 174 than the downstream termination point 176. In preferred embodiments, if the axial distance between the upstream termination point 174 and the maximum depth point 175 is divided by the axial distance between the upstream termination point 174 and the downstream termination point 176, the value will be within the range of 0.1 and 0.9. More preferably, if the axial distance between the upstream termination point 174 and the maximum depth point 175 is divided by the axial distance between the upstream termination point 174 and the downstream termination point 176, the value will be within the range of 0.25 and 0.75.

FIG. 7 is a view looking downstream of neighboring turbine blades 152 that each includes an airfoil 154 and a platform 156. FIG. 7 also includes a section view of the trough 170 (note that the dotted lines illustrate the radial height of a conventional axisymmetrical platform). As shown, circumferentially, the trough 170 (from right to left in FIG. 7) generally extends from about the pressure side 160 to about the suction side 162 of neighboring airfoils 154. That is, at a pressure side termination point 180, which may be at about the circumferential location as the pressure side 160 of the airfoil 154, the trough 170 may extend toward the neighboring airfoil 170, through a second maximum depth point 182, and terminate at a suction side termination point 184. As illustrated, from the pressure side termination point 180 the trough 170 generally forms a smooth convex curve that extends in an inward radial direction. At a point approximately halfway between the pressure side termination point 180 and the second maximum depth point 182, the contour shape of the trough 170 may smoothly transition from a convex shape to a concave shape that continues in an inward radial direction. At the second maximum depth point 182, the smooth concave curve may continue, though at this point the trough extends in an outward radial direction. At a point approximately halfway between the maximum depth point 175 and the suction side termination point 184, the contour shape of the trough 170 may smoothly transition from a concave shape to a convex shape that continues in an outward radial direction until it reaches the suction side termination point 184.

As illustrated in FIG. 7, the second maximum depth point 182 may be located closer to the suction side termination point 184 than the pressure side termination point 180. In preferred embodiments, if the circumferential distance between the suction side termination point 184 and the second maximum depth point 182 is divided by the circumferential distance between the suction side termination point 184 and the pressure side termination point 180, the value will be within the range of 0.1 and 0.6. More preferably, if the circumferential distance between the suction side termination point 184 and the second maximum depth point 182 is divided by the circumferential distance between the suction side termination point 184 and the pressure side termination point 180, the value will be within the range of 0.2 and 0.5.

In some embodiments, as also illustrated in FIG. 5, a bump or ridge 190 may be formed along the leading edge of the trough 170. It has been discovered that a ridge formed in this location as described herein further decreases the frictional losses between the main flow and the inner wall 157. The leading edge ridge 190 may comprise an elongated raised area that resides between the pressure side 160 of the airfoil 154 and the leading edge portions of the trough 170. In some preferred embodiments, the axis of elongation of the leading edge ridge 190 may form an angle of between approximately 30° and 60° with a line oriented in an axial direction. In some preferred embodiments, the maximum radial height of the leading edge ridge 190 may be within a range of about 0.00002 and 0.05 m. Alternatively, in some preferred embodiments, the maximum radial height of the leading edge ridge 190 may be described in relation to the radial height of the airfoil 154. In such cases, the maximum radial height of the leading edge ridge 190 may be within the range of between about 0.1% to 5% of the radial height of the airfoil 154.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. A flow directing assembly for use in a compressor or a turbine of a turbine engine comprising:

a plurality of circumferentially spaced blades, each of the blades including a radial projecting airfoil with a concave pressure side and a convex suction side that extend from a platform; and a plurality of flow passages, each of the flow passages defined by the airfoils of a neighboring pair of blades and an inner wall formed by an abutting pair of platforms of the neighboring pair of blades, the inner wall forming an inner radial boundary of the flow passage;

wherein the inner wall of one or more of the flow passages comprises means for reducing frictional losses between a flow of working fluid through the turbine engine and the inner wall;

wherein the means for reducing frictional losses comprises a non-axisymmetrical trough and a leading edge ridge positioned between the neighboring pair of airfoils;

wherein each of the troughs is circumferentially positioned between the airfoils of the neighboring pair of blades;

wherein each of the troughs extends from an area between leading edges of the airfoils to an area between trailing edges of the airfoils, each of the troughs comprising a leading edge portion positioned between the leading edges of the airfoils; and wherein each of the leading edge ridges comprises an elongated raised area that resides approximately between a forward area of the pressure side of the airfoil and the leading edge portion of each of the troughs.

2. The flow directing assembly according to claim 1, wherein:

each of the troughs comprises a smoothly shaped elongated depression formed in the inner wall; and an axis of elongation of each of the troughs extends in an approximate axial direction.

3. The flow directing assembly according to claim 1, wherein:

a first side of each of the troughs is formed at or near a location on the inner wall where the pressure side of a first one of the airfoils begins, the first side of each of the troughs generally conforming to a shape that the pressure side of the first one of the airfoils makes at the inner wall;

a second side of each of the troughs is formed at or near a location on the inner wall where the suction side of a second one of the airfoils begins, the second side of each of the troughs generally conforming to a shape that the suction side of the second one of the airfoils makes at the inner wall;

a third side of each of the troughs is formed at or near a line extending between the leading edges of the first one of the airfoils and the second one of the airfoils; and a fourth side of each of the troughs is formed at or near a line extending between the trailing edges of the first one of the airfoils and the second one of the airfoils.

4. The flow directing assembly according to claim 3, wherein each of the troughs slopes radially inward from a shallow radial depth at a perimeter of each of the troughs to a maximum radial depth at an approximate center of each of the troughs.

5. The flow directing assembly according to claim 1, wherein each of the troughs is disposed between an axial location of the leading edges and an axial location of the trailing edges of the airfoils within a row of the blades.

6. The flow directing assembly according to claim 1, wherein a maximum radial depth of each of the troughs comprises a value within a range of about 0.0002 to 0.05 m.

7. The flow directing assembly according to claim 1, wherein a maximum radial depth of each of the troughs comprises a value within a range of about 0.0004 to 0.025 m.

8. The flow directing assembly according to claim 1, wherein a maximum radial depth of each of the troughs comprises a value within a range of about 0.001 to 0.01 m.

9. The flow directing assembly according to claim 1, wherein a maximum radial depth of each of the troughs divided by a radial height of the airfoils comprises a value within a range of about 0.001 to 0.05.

10. The flow directing assembly according to claim 1, wherein a maximum radial depth of each of the troughs divided by a radial height of the airfoils comprises a value within a range of about 0.0025 to 0.025.

11. The flow directing assembly according to claim 1, wherein a maximum radial depth of each of the troughs divided by a radial height of the airfoils comprises a value within a range of about 0.005 to 0.01.

12. The flow directing assembly according to claim 1, wherein each of the troughs forms the following described contour in the inner wall as it extends from an upstream termination point, which comprises approximately a same axial location as leading edge of the airfoils, to a downstream termination point, which comprises approximately a same axial location as the trailing edges of the airfoils:

from the upstream termination point each of the troughs generally forms a smooth convex curve that extends in an inward radial direction;

at a point approximately halfway between the upstream termination point and a maximum depth point, each of the troughs smoothly transitions from a convex shape to a concave shape that continues in an inward radial direction;

at the maximum depth point, the smooth concave curve continues, extending in an outward radial direction; and at a point approximately halfway between the maximum depth point and the downstream termination point, each of the troughs smoothly transitions from a concave shape to a convex shape that continues in an outward radial direction until it reaches the downstream termination point.

13. The flow directing assembly according to claim 12, wherein the maximum depth point is located closer to the upstream termination point than the downstream termination point.

14. The flow directing assembly according to claim 13, wherein if an axial distance between the upstream termination point and the maximum depth point is divided by the axial distance between the upstream termination point and the downstream termination point, a value is within a range of about 0.1 and 0.9.

15. The flow directing assembly according to claim 14, wherein if the axial distance between the upstream termination point and the maximum depth point is divided by the axial distance between the upstream termination point and the downstream termination point, the value is within a range of about 0.25 and 0.75.

16. The flow directing assembly according to claim 1, wherein each of the troughs forms the following described contour in the inner wall as it extends from a pressure side termination point, which comprises approximately a same circumferential location as the pressure side of the airfoils, to a suction side termination point, which comprises approximately a same circumferential location as the suction side of the airfoils:

from the pressure side termination point each of the troughs generally forms a smooth convex curve that extends in an inward radial direction;

at a point approximately halfway between the pressure side termination point and a maximum depth point, each of the troughs smoothly transitions from a convex shape to a concave shape that continues in an inward radial direction;

at the maximum depth point, the smooth concave curve continues, extending in an outward radial direction; and at a point approximately halfway between the maximum depth point and the suction side termination point, each of the troughs smoothly transitions from a concave shape to a convex shape that continues in an outward radial direction until it reaches the suction side termination point.

17. The flow directing assembly according to claim 16, wherein the maximum depth point is located closer to the suction side termination point than the pressure side termination point.

18. The flow directing assembly according to claim 17, wherein if a circumferential distance between the suction side termination point and the maximum depth point is divided by a circumferential distance between the suction side termination point and the pressure side termination point, a value is within a range of about 0.1 and 0.6.

19. The flow directing assembly according to claim 17, wherein if a circumferential distance between the suction side termination point and the maximum depth point is divided by a circumferential distance between the suction side termination point and the pressure side termination point, a value is within a range of about 0.2 and 0.5.

20. The flow directing assembly according to claim 1, wherein an axis of elongation of each of the leading edge ridges forms an angle of between approximately 30° and 60° with a line oriented in an axial direction.

21. The flow directing assembly according to claim 20, wherein a maximum radial height of each of the leading edge ridges is within a range of about 0.00002 and 0.05 m.

22. The flow directing assembly according to claim 20, wherein a maximum radial height of each of the leading edge ridges divided by a radial height of the airfoils comprises a value within a range of about 0.001 to 0.05.

* * * * *